United States Patent [19]

Billard et al.

[11] 4,430,650
[45] Feb. 7, 1984

[54] DISPLAY PROCESS USING A THERMO-OPTICAL EFFECT WITH A MEMORY IN A THIN DISC-LIKE LIQUID CRYSTAL LAYER AND DISC-LIKE LIQUID CRYSTALS HAVING SUCH AN EFFECT

[75] Inventors: Jean Billard; Jean-Claude Dubois; Michel Hareng; Serge Le Berre; Jean-Noël Perbet, all of Paris, France

[73] Assignee: Thomson-CSF, Paris, France

[21] Appl. No.: 298,185

[22] Filed: Aug. 31, 1981

[30] Foreign Application Priority Data

Sep. 2, 1980 [FR] France ............................. 80 18924

[51] Int. Cl.³ .................. C09K 3/34; G02F 1/133; G02F 1/137; G09F 9/35
[52] U.S. Cl. ................... 340/784; 252/299.01; 252/299.6; 252/299.62; 340/713; 340/794; 350/330; 350/350 R; 350/351; 350/331 R; 358/60; 358/61; 358/230
[58] Field of Search .............. 340/713, 784, 765; 350/351, 330, 232, 333, 350 R; 252/299.6, 299.01, 299.62; 358/61, 60, 230

[56] References Cited

U.S. PATENT DOCUMENTS

| | | | |
|---|---|---|---|
| 4,031,529 | 6/1977 | Borel et al. | 350/351 |
| 4,040,047 | 8/1977 | Hareng et al. | 350/351 |
| 4,099,857 | 7/1978 | Hareng et al. | 350/351 |
| 4,150,396 | 4/1979 | Hareng et al. | 350/351 |
| 4,202,010 | 5/1980 | Hareng et al. | 350/351 |
| 4,240,712 | 12/1980 | Thirant | 350/351 |
| 4,333,709 | 6/1982 | Dubois et al. | 252/299.6 |

FOREIGN PATENT DOCUMENTS 2275087 1/1976 France .
2389955 12/1978 France .

OTHER PUBLICATIONS

Tinh, N., et al., Phys. Lett., vol. 72A, No. 3, pp. 251-254 (1979).
Sorai, M., et al., Mol. Cryst. Liq. Cryst., vol. 80, pp. 33-58 (1980) (Apr. 1980).
Destrade, C., et al., Mol. Cryst. Liq. Cryst., vol. 49 (Lett), pp. 169-174 (1979).
Destrade, C., et al., J. de Phys., Coll. C3, Suppl. No. 4, Tome 40, pp. C3-17 (Apr. 1979).
Chandrasekhar, S., Ind., J. Pure and Appl. Physics, vol. 19, pp. 769-773 (Sep. 1981).
Gooday, J. W., et al., Mol. Cryst. Liq. Cryst., vol. 56 (Lett.), pp. 303-309 (1980).
Tinh, N., et al., Mol. Cryst. Liq. Cryst., vol. 68, pp. 101-111 (1981).
Destrade, C., et al., Mol. Cryst. Liq. Cryst., vol. 71, pp. 111-135 (1981).
Chandrasekhar, S., Mol. Cryst. Liq. Cryst., vol. 63, pp. 171-180 (1981).
Molecular Crystals and Liquid Crystals vol. 49, No. 6, 1979, Gordon and Breach Science Publishers Ltd. (US) C. Destrade et al: "Mesomorphic Polymorphism in some disc-like Compounds" pp. 169-174.
Physics Letters, vol. 72A, No. 3, Jul. 9, 1979 Amsterdam (NL) Nguyen Huu Tinh et al: "Nematic disc-like Liquid Crystals" pp. 251-254.

Primary Examiner—Teddy S. Gron
Attorney, Agent, or Firm—Oblon, Fisher, Spivak, McClelland & Maier

[57] ABSTRACT

A process wherein certain disc-like liquid crystals, which locally undergo heating and then rapid cooling on either side of the transition temperature between two mesophases permit the liquid crystal to become diffuse with an adequate contrast to be used for display purposes. The following liquid crystals can be utilized, i.e. triphenylene derivatives of formulas:

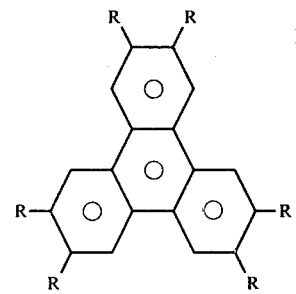

in which R = $C_9H_{19}$—O—⟨O⟩—COO— and R = $C_8H_{17}$—O—⟨O⟩—COO—

6 Claims, No Drawings

DISPLAY PROCESS USING A THERMO-OPTICAL EFFECT WITH A MEMORY IN A THIN DISC-LIKE LIQUID CRYSTAL LAYER AND DISC-LIKE LIQUID CRYSTALS HAVING SUCH AN EFFECT

BACKGROUND OF THE INVENTION

The present invention relates to a display process using a thermo-optical effect with a memory in a thin disc-like liquid crystal layer. It also relates to disc-like liquid crystals having such an effect.

It is known that the thermo-optical effect in a liquid crystal can be used for display purposes. Cholesteric and smectic liquid crystals are used in the prior art. The recently discovered disc-like liquid crystals would not appear likely to have a thermo-optical effect which can be used for display purposes.

Thus, the following conditions have to be fulfilled for such a use. The liquid crystal, placed in a thin layer between two transparent plates, is raised to a temperature which is a few degrees centigrade below the temperature at which the mesomorphic phase used (smectic or cholesteric) has a transition to another mesomorphic phase or a isotropic liquid phase. It is ensured that the layer is uniformly oriented either as a result of a prior treatment of the face of the supporting plates in contact with the layer or by applying an electrical field. It is therefore perfectly and uniformly transparent.

An inscription light beam, generally chosen in the near infrared range, is moduled in intensity by a signal transmitting the image to be inscribed and scans the cell point-by-point. When the energy applied at a point by the beam has proved adequate to locally heat the liquid crystal to beyond the transition point and providing that the cooling conditions favour a rapid return to the initial temperature, a microscopically ordered texture then forms, e.g. a focal conical structure in the case of smectic crystals, but is macroscopically disordered. In the case of certain cholesteric and certain smectic crystals, it is sufficiently diffuse to give a good contrast compared with the points where the transparency state has been maintained. This state is precisely that of the points where the light energy of the modulated beam has been inadequate to bring about the transition. Moreover, there is a "memory" effect and the information can be retained by the diffuse state and this can extend to beyond about 100 hours.

By projecting the image of the cell, e.g. by means of an optical device onto a screen, the non-diffuse points of the cell appear as bright points and the diffuse points as dark points.

Variants of the display method described hereinbefore exist. However, in all cases, the possibility of a display with a memory effect is only possible if the reverse transition obtained by rapid cooling creates a macroscopically disordered structure, which is also stable, as in the case of the focal conical structure of smectic crystals.

Another possibility for the advantageous use of liquid crystals for display purposes is based on the possibility of voluntarily eliminating the disorder created by the rapid cooling by applying for the duration of this rapid cooling period, a transverse alternating electric field with a frequency of about 1 kHz. Under the orienting influence of the field, the points which have undergone the transition return to the macroscopically ordered mesomorphic phase, i.e. to the transparent state. The use of a variable field then makes it possible to eliminate the modulation of the beam during the inscription phase.

Certain disc-like liquid crystals and in particular hexasubstituted triphenylene derivatives have the following mesophases:

a thread disc-like mesophase $D_F$
a mosaic texture mesophase $D_B$
in exceptional cases, other mesophases, such as the inclined disc-like phase.

The mesophase $D_F$ has an order in which only the parallelism of the small discs constituted by the liquid crystal molecules is strictly respected, except for the thermal agitation. Unlike in the case of the focal conical structure of smectic crystals, there is no law governing the distance between two groups of molecules located in two parallel planes. Such a structure is transparent and has no diffuse effect.

The mesophase $D_B$ corresponds to stacks of molecules in columns. In these columns, the molecules are parallel to one another and in particular to the axis of each column.

With regards to the electric field effect in phase $D_F$, it is known that the molecular discs can be oriented due to the existence of a dielectric anisotropy which, in the case of hexasubstituted triphenylene derivatives is usually positive. Conversely, the mesophase $D_B$ is insensitive to the electric field.

BRIEF SUMMARY OF THE INVENTION

The object of the invention is to use the thermo-optical properties of these disc-like crystals.

In a first mode of the process according to the invention a disc-like liquid crystal cell in the $D_B$ or inclined phase is formed having a liquid crystal layer uniformly oriented between two supporting plates transparent in visible light and means are used for the point-by-point scanning of the cell using an inscription light beam of wavelength such that the cell absorbs part of the light energy.

This first process comprises the following stages:
(a) an inscription stage in which the beam is modulated in intensity in such a way that at each point the liquid crystal is or is not raised, as a function of the information to be inscribed, to a temperature such that the liquid crystal is in the $D_F$ phase or in the isotropic phase;
(b) a cooling stage in which the heat dissipation conditions are such that the liquid crystal rapidly reaches the temperature of the $D_B$ phase or the inclined disc-like phase.

In a second mode of the process according to the invention, a disc-like liquid crystal cell is formed in the $D_B$ or inclined phase having a liquid crystal layer uniformly oriented between two transparent supporting plates and covered with visible light-transparent electrodes. Means are used for the point-by-point scanning of the cell using an inscription light beam. Means are also provided for applying voltage pulses between the electrodes during the cooling stage.

This second mode comprises the following stages:
(a) an inscription stage in which the beam scans the different points of the cell with a constant intensity;
(b) a cooling stage in which the heat dissipation conditions are such that the liquid crystal rapidly reaches the temperature of the $D_B$ phase or the inclined disc-like phase, voltage pulses being applied between the electrodes of the cell during the cooling stage.

In a third mode of the process according to the invention a liquid crystal cell is formed, which is equipped with a matrix having lines and columns. The lines are materialized by heating elements selectively excited by a voltage. The columns, which intersect the line system, receive voltages of given values as a function of the information to be inscribed.

This third mode comprises the following stages:
(a) an inscription stage during which the points of the cell located on the same line of heating elements are raised to a temperature such that the liquid crystal is in the $D_F$ phase or in the isotropic phase;
(b) a cooling stage during which the points of the cell positioned on one and the same column become more or less diffuse as a function of the voltage applied.

DETAILED DESCRIPTION OF THE PREFERRED EMBODIMENTS

Other features of the invention can be gathered from the following description of non-limitative embodiments.

The skeleton of the hexasubstituted triphenylene derivative is as follows:

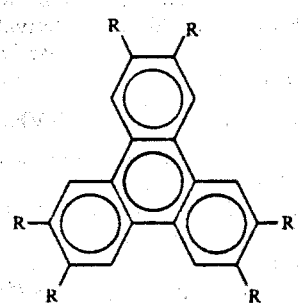

The following products, cited as Examples, have the thermo-optical effect with a memory and are characterized by the following definitions of the R radical.

EXAMPLE I

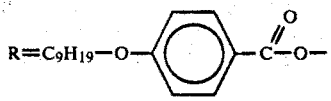

whose transitions are symbolized hereinafter:
K 149° C. $D_B$ 183° C. $D_F$ 228° C. I
in which K represents the crystalline phase, $D_B$ and $D_F$ the known disc-like phases and I the isotropic phase.

The energy necessary for inscribing information is 0.3 Joule/cm².

EXAMPLE II

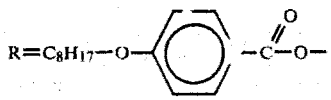

whose transitions are:
K—inclined disc-like phase—$D_F$—I.

For applying the process according to the invention, it is possible to use mixtures of pure products with other hexasubstituted triphenylene derivatives. As a result, the transition temperatures are lowered.

The voltages applied between the transparent electrodes in the second process are 30 V r.m.s at a frequency of 5 kHz for a liquid crystal layer of thickness 10 microns.

These voltage pulses permit a selective erasure at predetermined points, provided that they are applied at the time when the beam scans the point of the cell at which the inscription of no information is required.

The invention can be used in thermo-optical valves with a possibility of selective erasure and to matrix access means with heating by lines and application of the voltage of the signal to be inscribed by columns. Reference should be made to patent applications 77 13 738 (France), 54020/78 (Japan) and Ser. No. 902,112 (U.S.A.) filed May 2, 1978 by the Assignee, now U.S. Pat. No. 4,202,010, and relating to an "image display apparatus and television system using such an apparatus".

The interest of the use of disc-like liquid crystals in place of smectic or cholesteric crystals is due to two main factors:
(1) A uniform orientation relative to the walls of the liquid crystal cell is more easily obtained.
(2) A shorter response time to the action of an electric field is obtained, particularly in the case of inclined disc-like and $D_B$ mesophases. For example, in the case of selective erasure, voltage pulses can be much shorter than 1/10 of a second, which is the time necessary to pass from the diffuse state to the transparent state in the case of smectic crystals.

Finally, the memory effect obtained is as durable as that of conventional liquid crystals.

What is claimed is:
1. A display process having information memory using a cell which comprises a liquid crystal layer uniformly oriented between 2 transparent supporting plates, said cell being scanned by an inscription light beam, the process comprising:
(a) modulating the intensity of said light beam as a function of the information to be inscribed, thereby raising the temperature of some points of said liquid crystal layer so as to change said liquid crystal layer points from an initial phase to a second phase, and
(b) rapidly cooling said points changed to the second phase to a temperature corresponding to the initial phase, thereby causing said points to exist in a diffuse state,
wherein said liquid crystal has the formula (I):

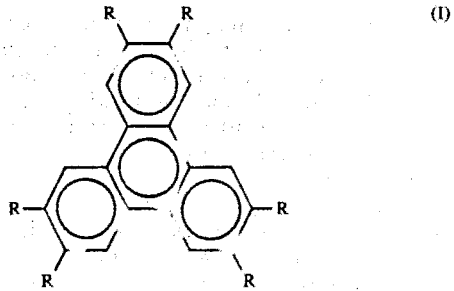

wherein R is

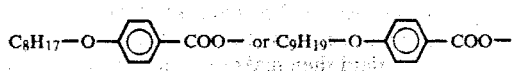

-continued and wherein said initial phase is a $D_B$ mesophase having a mosaic texture and said second phase is a $D_F$ disk-like mesophase or isotropic phase.

2. A display process having information memory using a cell which comprises a liquid crystal layer uniformly oriented between 2 transparent supporting plates, said cell being scanned by an inscription light beam, the process comrpsiing:
   (a) modulating the intensity of said light beam as a function of the information to be incribed, thereby raising the temperature of some points of said liquid crystal layer so as to change said liquid crystal layer points from an initial phase to a second phase, and
   (b) rapidly cooling said points changed to the second phase to a temperature corresponding to the initial phase, thereby causing said points to exist in a diffuse state,
wherein said liquid crystal has the formula (I)

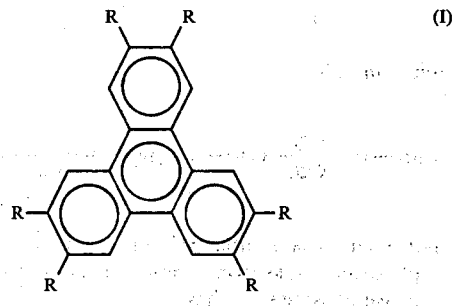

wherein R is

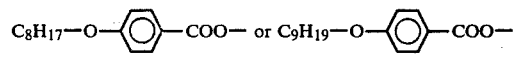

and wherein said initial phase is an inclined disk-like phase and said second phase is a $D_F$ disk-like mesophase or isotropic phase.

3. A display process having information memory using a cell which comprises a liquid crystal layer uniformly oriented between 2 transparent supporting plates, each plate being covered on its internal face with at least one transparent electrode, said cell being scanned by an inscription light beam and being subjected to voltage pulses applied by said electrodes, the process comprising:
   (a) scanning different points of said cell with a light beam of constant intensity, thereby raising the temperature of said points so as to change said points from an initial phase to a second phase, and
   (b) rapidly cooling said points changed to the second phase to a temperature corresponding to the initial phase, said voltage pulses being applied during cooling,
wherein said liquid crystal has the formula (I)

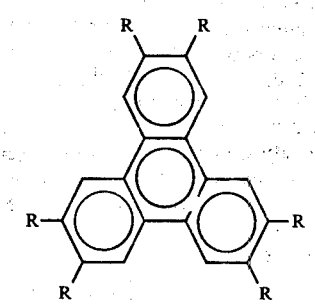

wherein R is

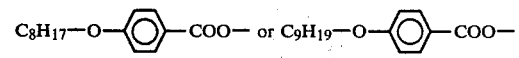

and wherein said initial phase is a $D_B$ mesophase having a mosaic texture and said second phase is a $D_F$ disk-like mesophase or isotropic phase.

4. A display process having information memory using a cell which comprises a liquid crystal layer uniformly oriented between 2 transparent supporting plates, each plate being covered on its internal face with at least one transparent electrode, said cell being scanned by an inscription light beam and being subjected to voltage pulses applied by said electrodes, the process comprising:
   (a) scanning different points of said cell with a light beam of constant intensity, thereby raising the temperature of said points so as to change said points from an initial phase to a second phase, and
   (b) rapidly cooling said points changed to the second phase to a temperature corresponding to the initial phase, said voltage pulses being applied during cooling,
wherein said liquid crystal has the formula (I)

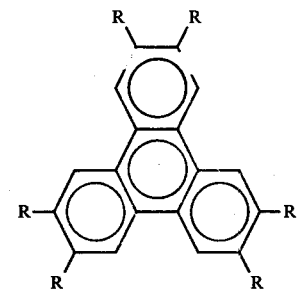

wherein R is

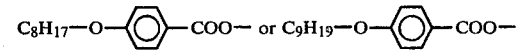

and wherein said initial phase is an inclined disk-like phase and said second hase is a $D_F$ disk-like mesophase or isotropic phase.

5. A display process having information memory using a cell which comprises a liquid crystal layer uniformly oriented between 2 transparent supporting plates, each plate being covered on its internal face with two sets of electrodes forming a matrix system of lines and columns, the electrodes of one set being selectively heated, the two sets cooperating in order to apply voltage pulses to the layer as a function of the information to be inscribed, the process comprising:
 (a) heating the points of the liquid crystal layer, by means of a heating electrode, thereby raising the temperature of said points so as to change said points from an initial phase to a second phase, and
 (b) cooling said points changed to the second phase to a temperature corresponding to the initial phase, said voltage pulses being applied during cooling, wherein said liquid crystal has the formula (I)

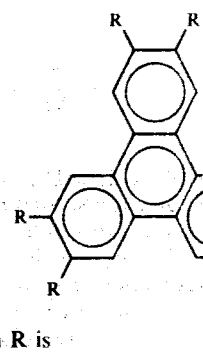  (I)

wherein R is

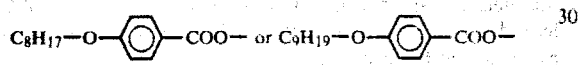

and wherein said initial phase is a $D_B$ mesophase having a mosaic texture and said second phase is a $D_F$ disk-like mesophase or isotropic phase.

6. A display process having information memory using a cell which comprises a liquid crystal layer uniformly oriented between 2 transparent supporting plates, each plate being covered on its internal face with two sets of electrodes forming a matrix system of lines and columns, the electrodes of one set being selectively heated, the two sets cooperating in order to apply voltage pulses to the layer as a function of the information to be inscribed, the process comprising:
 (a) heating the points of the liquid crystal layer, by means of a heating electrode, thereby raising the temperature of said points so as to change said points from an initial phase to a second phase, and
 (b) cooling said points changed to the second phase to a temperature corresponding to the initial phase, said voltage pulses being applied during cooling, wherein said liquid crystal has the formula (I)

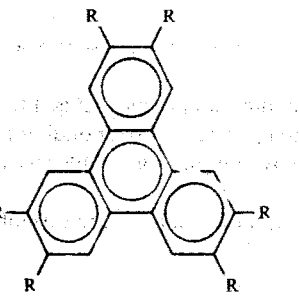  (I)

wherein R is

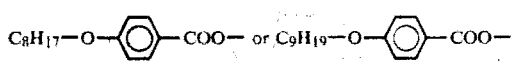

and wherein said initial phase is an inclined disk-like phase and said second phase is a $D_F$ disk-like mesophase or isotropic phase.

* * * * *